(12) United States Patent
Orus et al.

(10) Patent No.: US 12,710,748 B1
(45) Date of Patent: Aug. 18, 2026

(54) OPTIMIZER AND OPTIMIZATION BASED ON VARIATIONAL ROTATIONAL LANDSCAPE

(71) Applicant: Multiverse Computing, S.L., Donostia—San Sebastian (ES)

(72) Inventors: Roman Orus, Donostia—San Sebastian (ES); Pablo Bermejo, Donostia—San Sebastian (ES); Borja Aizpurua, Donostia—San Sebastian (ES)

(73) Assignee: Multiverse Computing, S.L., Donostia—San Sebastian (ES)

( * ) Notice: Subject to any disclaimer, the term of this patent is extended or adjusted under 35 U.S.C. 154(b) by 506 days.

(21) Appl. No.: 18/334,393

(22) Filed: Jun. 14, 2023

(30) Foreign Application Priority Data

May 23, 2023 (EP) .................................... 23382482

(51) Int. Cl.
*G05B 19/418* (2006.01)

(52) U.S. Cl.
CPC .................. *G05B 19/41885* (2013.01); *G05B 2219/36301* (2013.01)

(58) Field of Classification Search
None
See application file for complete search history.

(56) References Cited

U.S. PATENT DOCUMENTS

2024/0201639 A1* 6/2024 Copperthite ......... G05B 19/418

OTHER PUBLICATIONS

Henseler et al.: "Back Propagation", Jan. 1, 2005 (2005-01-01), SAT 2015 18th International Conference, Austin, TX, USA, Sep. 24-27, 2015; [Lecture Notes in Computer Science; Lect. Notes Computer], Springer, Berlin, Heidelberg, pp. 37-66, XP047291547, ISBN: 978-3-540-74549-5.

Ivan Tyukin et al: "Parameter Estimation of Sigmoid Superpositions: Dynamical System Approach", arxiv.org, Cornell University Library, 201 Olin Library Cornell University Ithaca, NY, 14853, Jul. 9, 2002 (Jul. 9, 2002), XP080087954, DOI: 10.1162/089976603322362428.

* cited by examiner

*Primary Examiner* — Ryan A Jarrett
(74) *Attorney, Agent, or Firm* — PROI Intellectual Property US

(57) ABSTRACT

An apparatus or system comprising at least one classical processor and/or at least one quantum processor configured to calculate a first cost of a predetermined cost function associated with both a predetermined optimization problem and a set of variables as parameters, and calculate the cost of the cost function a plurality of times running an optimization by applying gradient descent to a converted set of variables a plurality of times considering the most recent calculated cost of the cost function in each conversion of the set of variables.

20 Claims, 3 Drawing Sheets

1
10
20
30
60

31
32
33
34
49
50a
49
30

41
42
43
44
45
49
50b
30
49

61
62
60

OPTIMIZER AND OPTIMIZATION BASED ON VARIATIONAL ROTATIONAL LANDSCAPE

TECHNICAL FIELD

The present disclosure relates to the field of control. More specifically, the disclosure relates to solving optimization problems for improved control and configuration of devices, systems and processes.

BACKGROUND

An adequate configuration and control of devices, systems and processes is essential for the operation thereof to be correct and/or as good as possible. The evolution of the technology has increased the complexity of the devices, systems and processes in general and, as a result, the setting up and the control of these have become very complex tasks. As more variables come into play, more interrelationships exist between components and other devices, systems or processes than influence the operation of ones and others.

Many resources have to be dedicated to the configuration and control of devices and systems, which effectively require running optimization techniques, either manually, e.g., a person or a team decides how to set the variables based on experience and data available at that time, or automatically, e.g., a computing device and/or a controller processes the data available at that time to decide how to set the variables based on a set of conditions and/or models using numerical methods.

When it comes to numerical methods, the solving of optimization problems frequently involves the (partial) sweeping of a hyperspace of solutions. The sweeping is partial because not all solutions of the vast set of solutions are explored, let alone tested. Depending on the technique used for sweeping the landscape of solutions, the solution to the problem found will be closer or farther from the optimal solution. It is known in the art that, aside from convex optimization problems, the majority of the optimization problems feature a landscape, which can be considered an ill-defined landscape of solutions, with complex, non-predictable shapes that limit the effectiveness of analytical and numerical methods acting on them.

A frequent numerical method used in optimization problems is gradient descent with which the landscape of solutions is explored based on local gradients and updates the set of variables of the optimization problem according to local slopes of the cost function. Local minima and plateaus, however, severely limit the reach of gradient descent as a result of the loss of convexity in the cost function.

There is interest in finding optimization techniques that are able to overcome limitations of optimization techniques such as gradient descent, and that preferably are simple to run. Improved optimization techniques have significant influence on the adequate performance of devices, systems and processes that are set up and controlled with a superior set of variables thereof, either manually or automatically. Further, there is also interest in finding optimization techniques that might reduce total power consumption and/or the time they take to solve an optimization problem to reduce the energy footprint thereof in comparison to prior art optimization techniques and increase reliability in the control of a target.

SUMMARY

A first aspect relates to an apparatus or system including at least one classical processor and/or at least one quantum processor configured to at least perform the following:

calculate a cost of a predetermined cost function, $f(x)$, associated with both a predetermined optimization problem and a set of variables as parameters, wherein the cost is calculated taking a predetermined set of the variables, x, associated with the predetermined optimization problem as parameters;

include the calculated cost in the set of the variables x;

repeat the following N times:

- define a first predetermined coordinate system with a set formed by the set of the variables x including the most recent calculated cost of the cost function $f(x)$, thereby obtaining a functional $F[f]$;
- apply gradient descent to the functional $F[f]$, thereby obtaining an optimized functional $F_O[f]$;
- convert the optimized functional $F_O[f]$ into a second predetermined coordinate system different from the first predetermined coordinate system, and provide the set of the variables x with values from the converted optimized functional $F_O[f]$, thereby obtaining an updated set of the variables $x_U$; and
- calculate the cost of the cost function $f(x)$ taking the updated set of the variables $x_U$ as parameters;

replace the set of the variables x by the updated set of the variables $x_U$ in at least all repetitions from the first to the N-th minus one, and in each said replacement or after each said replacement, replace the cost of the cost function $f(x)$ by the most recent calculated cost of the cost function $f(x)$ so that the set of the variables x includes the most recent calculated cost of the cost function $f(x)$.

The N repetitions take place at least until a difference between the most recent cost of the cost function $f(x)$, as calculated in the last repetition, and at least one previous cost of the cost function $f(x)$, as calculated in one previous repetition, is equal to or less than a predetermined convergence threshold. Thus, N will be determined by the number of times having occurred before the minimum convergence set has been reached. N is a natural number greater than one (1), consequently at least two repetitions for optimization take place.

The apparatus or system solves the predetermined optimization problem so that the final set of the variables x and/or the final updated set of the variables $x_U$, i.e., the sets of the variables that are available after conducting the repetitions, can be used to configure and/or control a target, e.g., a device, a system, a process, etc., being associated with the predetermined optimization problem; the variables are, in this sense, parameters of the target. Therefore, such final set or sets can be provided as an output of the apparatus or system, for example in the form of user perceptible signals so that a person or a team can input one, some or all variables into the target or a controller thereof, or in the form of one or several instructions for automatic configuration or reconfiguration of the target or the controller thereof.

In order to solve the optimization problem with an optimization technique that has fewer limitations in terms of local minima and barren plateaus as it will be explained next, the apparatus or system sweeps the hyperspace of solutions using different coordinates, particularly those of the first predetermined coordinate system, and which in the following will be considered hypersphere coordinates for the sake of the explanation even though other coordinate systems fall within the scope of present disclosure as well. In the hypersphere coordinates, the incorporation of the calculated cost of the predetermined cost function $f(x)$ introduces a further dimension to be considered, particularly the dimension of the cost itself, thus increasing the freedom in the directions of the variables during optimization. In this sense, the dimension of the cost is relevant to the optimization because the cost is also considered as a variable to be optimized. That is to say, among all variables that are part of the set of variables x and which stem from the target itself, a further variable is added, which is the cost. This effectively results in the optimization, based on gradient descent, of an alternate set of variables: that associated with the target and the cost of the cost function $f(x)$, also in hypersphere coordinates, both in hypersphere coordinates since it is in this coordinate system where the optimization is conducted.

The additional variable, namely dimension, that the cost introduces, reduces the likelihood of encountering local minima and plateaus during the optimization. And as aforementioned, since the cost variable is also optimized, it also additionally influences the optimization altogether.

In each optimization repetition, the set initially formed by the variables (including the calculated cost) in the second predetermined coordinate system (for example, but without limitation, a Cartesian coordinate system) has become the functional in the first predetermined coordinate system, e.g., hyperspherical coordinate system, optimized, and then converted back into the second predetermined coordinate system. The set of variables x retrieved at that point, i.e., after conversion of the optimized functional $F_O[f]$ that has the updated set of variables $x_U$, is in the second predetermined coordinate system as well and is inputted to the cost function $f(x)$ for evaluation of the cost. If there has not been sufficient convergence, the resulting cost is incorporated into the most recent set of variables x (the converted updated set of the variables $x_U$) and the former cost is withdrawn, so that the subsequent optimization repetition has an updated set of the variables (with an updated calculated cost) for conversion into the hypersphere coordinate system, optimization, and conversion back to the second predetermined coordinate system for further evaluation and, optionally, optimization depending on the attained convergence.

A second aspect relates to an apparatus or system including at least one classical processor and/or at least one quantum processor configured to at least perform the following:

- calculate a cost of a predetermined cost function, $f(x)$, associated with both a predetermined optimization problem and a set of variables as parameters, wherein the cost is calculated taking a predetermined set of the variables, x, associated with the predetermined optimization problem as parameters;
- include the calculated cost in the set of the variables x;
- repeat the following N times:
  - define a first rotation matrix such that there is a turning angle between each variable in the set of the variables x and the most recent calculated cost of the cost function $f(x)$ in a first predetermined reference frame;
  - apply the first rotation matrix to the set of the variables x so that it is moved to a second predetermined reference frame;
  - apply gradient descent to the cost function $f(x)$ with the set of the variables x in the second predetermined reference frame, thereby obtaining an optimized set of the variables x in the second predetermined reference frame;
  - apply a second rotation matrix to the optimized set of the variables x in the second predetermined reference frame thereby obtaining an optimized set of the variables x in the first predetermined reference frame, the second rotation matrix being an inverse of the first rotation matrix; and
  - calculate the cost of the cost function $f(x)$ in the first predetermined reference frame with the optimized set of the variables x in the first predetermined reference frame;
- replace the set of the variables x by the optimized set of the variables x in the first predetermined reference frame in at least all repetitions from the first to the N-th minus one, and in each said replacement or after each said replacement, replace the cost of the cost function $f(x)$ by the most recent calculated cost of the cost function $f(x)$ so that the set of the variables x includes the most recent calculated cost of the cost function $f(x)$.

The N repetitions take place at least until a difference between the most recent cost of the cost function $f(x)$, as calculated in the last repetition, and at least one previous cost of the cost function $f(x)$, as calculated in one previous repetition, is equal to or less than a predetermined convergence threshold. Hence, like in the first aspect, N will be determined by the attained convergence. And N is a natural number greater than one.

Like in the first aspect, the apparatus or system is capable of solving the predetermined optimization problem associated with a target to be configured or controlled. The apparatus or system provides the final set of the variables x and/or the final updated set of the variables $x_U$ for adjusting the performance of the target.

The optimization conducted has similarities with respect to that of the first aspect. The cost of the cost function $f(x)$ is again considered a variational parameter of the optimization problem. As each variational parameter is an orthogonal axis, i.e., dimension, of the optimization problem in the Euclidean space thereof, the cost adds an additional orthogonal dimension that can be considered during the optimization process. To increase the freedom of gradient descent, a different reference frame is to be considered, hence the gradient descent is to be applied to the cost function $f(x)$ in the second predetermined reference frame.

To keep the result optimization meaningful, the cost function $f(x)$ and the set of the variables x must be considered in the original reference frame, i.e., the first predetermined reference frame. The first predetermined reference frame is, thus, a fixed reference frame, and the second predetermined reference frame is a rotating reference frame, and the optimization goes back and forth between two reference frames, or so to speak, since the second predetermined reference frame will vary throughout the optimization.

Rotation between the reference frames can be freely performed by way of rotation matrices, which are driven by turning angles between pairs of axes. Particularly, a pair of axes is provided per variable in the set of the variables x, with a first axis being that for the concerned variable, and a second axis being that for the cost. The turning angles between each pair are used to define the rotation matrix for rotating the set of the variables x from the first to the second reference frame, and then back to the first reference frame by way of the inverse rotation matrix, at which point gradient descent had already been applied to the cost function $f(x)$.

By applying the rotation, plains existing in the first reference frame are not flat in the second reference frame. Further, small increments in the variables cause a non-null increment in the predetermined cost function $f(x)$ once the fixed reference frame is recovered. For that, n turning angles, with n being the number of variables in the set of the variables x. That means that x', which is the set of the variables x in the second reference frame, is $x'=f(x,\theta)$, with $\theta$ being the set of relative angles of the axes of each pair, thus $\theta=\{\theta_1, \theta_2, \ldots \theta_n\}$.

The rotations can be defined in a number of ways, such as with rotation matrices in series, or variational turning angles, thereby enlarging the vector of variational parameters and, in turn, enlarging then the rotation matrices. The latter means that the turning angles, which act as a link between the first and second reference frames, may also be varied parameter-like. In this sense, in some embodiments of the second aspect, the at least one classical processor and/or at least one quantum processor is further configured to:

- include, in the set of the variables x, the axis for each variable; and
- optimize, in one or more repetitions of all the repetitions, the axis of each variable that is in the set of the variables x.

Further, the definition of the axis for each variable is based on the axis of each variable that is in the set of the variables x.

In some other embodiments of the first aspect and the second aspect, the at least one classical and/or at least one quantum processor is further configured to obtain the predetermined cost function from a computing device, which can be external or internal relative to the apparatus or system, or a user input device. In some embodiments of the first aspect and the second aspect, the at least one classical processor and/or at least one quantum processor is further configured to define the predetermined cost function based on data associated with the predetermined optimization problem.

The classical processor(s) and/or the quantum processor(s) may define the predetermined cost function to be considered for the optimization according to the circumstances, particularly the data available from the target and the optimization problem.

In some embodiments of the first aspect and the second aspect, the at least one classical processor and/or at least one quantum processor is further configured to obtain one or more variables of the set of the variables x from at least one or more sensors and/or one or more computing devices.

Sensors and/or computing devices, e.g., servers, associated with a target to be configured and/or controlled may provide part or a totality of the predetermined set of the variables to be initially used in the optimization. The one or more variables may also be historical, thus not up-to-date.

In some embodiments of the first aspect and the second aspect, the at least one classical processor and/or at least one quantum processor is further configured to command actuation of one or more controllers and/or actuators of a target based on one or more variables of the updated set of the variables $x_U$ after doing all the repetitions. The target is associated with the predetermined optimization problem.

A third aspect refers to a method for solving a predetermined optimization problem. The method is run in an apparatus or system that includes at least one classical processor and/or at least one quantum processor. The method at least includes the following:

- calculating a cost of a predetermined cost function, $f(x)$, associated with both a predetermined optimization problem and a set of variables as parameters, wherein the cost is calculated taking a predetermined set of the variables, x, associated with the predetermined optimization problem as parameters;
- including the calculated cost in the set of the variables x;
- repeating the following N times:
  - defining a first predetermined coordinate system with a set formed by the set of the variables x including the most recent calculated cost of the cost function $f(x)$, thereby obtaining a functional $F[f]$;
  - applying gradient descent to the functional $F[f]$, thereby obtaining an optimized functional $F_O[f]$;
  - converting the optimized functional $F_O[f]$ into a second predetermined coordinate system different from the first predetermined coordinate system, and providing the set of the variables x with values from the converted optimized functional $F_O[f]$, thereby obtaining an updated set of the variables $x_U$; and
  - calculating the cost of the cost function $f(x)$ taking the updated set of the variables $x_U$ as parameters; and
- replacing, at least in each repetition from the first to the N-th minus one, the set of the variables x by the updated set of the variables $x_U$, and in each said replacement step or after each said replacement step, replacing the cost of the cost function $f(x)$ by the most recent calculated cost of the cost function $f(x)$ so that the set of the variables x includes the most recent calculated cost of the cost function $f(x)$.

The repeating step is repeated as many times, particularly N times, at least until a difference between the most recent cost of the cost function $f(x)$ and at least one previous cost of the cost function $f(x)$ is equal to or less than a predetermined convergence threshold. Thus, N will be determined by the number of times having occurred before the minimum convergence set has been reached. Also, N is a natural number greater than one.

In some embodiments of the first aspect and the third aspect, the first predetermined coordinate system is a hyperspherical coordinate system.

In some embodiments of the first aspect and the third aspect, the second predetermined coordinate system is a Cartesian coordinate system.

A fourth aspect relates to a method for solving a predetermined optimization problem. The method is run in an apparatus or system that includes at least one classical processor and/or at least one quantum processor. The method includes at least the following:

- calculating a cost of a predetermined cost function, $f(x)$, associated with both a predetermined optimization problem and a set of variables as parameters, wherein the cost is calculated taking a predetermined set of the variables, x, associated with the predetermined optimization problem as parameters;
- including the calculated cost in the set of the variables x;
- repeating the following N times:
  - defining a first rotation matrix such that there is a turning angle between each variable in the set of the variables x and the most recent calculated cost of the cost function $f(x)$ in a first predetermined reference frame;
  - applying the first rotation matrix to the set of the variables x so that it is moved to a second predetermined reference frame;
  - applying gradient descent to the cost function $f(x)$ with the set of the variables x in the second predetermined reference frame, thereby obtaining an optimized set of the variables x in the second predetermined reference frame;
  - applying a second rotation matrix to the optimized x in the second predetermined reference frame set of the variables x in the second predetermined reference frame thereby obtaining an optimized set of the variables x in the first predetermined reference frame, the second rotation matrix being an inverse of the first rotation matrix;

calculating the cost of the cost function $f(x)$ in the first predetermined reference frame with the optimized set of the variables x in the first predetermined reference frame; and replacing, at least in each repetition from the first to the N-th minus one, the set of the variables x by the optimized set of the variables x in the first predetermined reference frame, and in each said replacement step or after each said replacement step, replacing the cost of the cost function $f(x)$ by the most recent calculated cost of the cost function $f(x)$ so that the set of the variables x includes the most recent calculated cost of the cost function $f(x)$.

The repeating step is repeated as many times, particularly N times, at least until a difference between the most recent cost of the cost function $f(x)$ and at least one previous cost of the cost function $f(x)$ is equal to or less than a predetermined convergence threshold. N is a natural number greater than one.

In some embodiments of the fourth aspect, the method further includes:

including, in the set of the variables x, the axis for each variable; and optimizing, in one or more repetitions of all the repetitions, the axis of each variable that is in the set of the variables x.

Also, the step of defining the axis for each variable is based on the axis of each variable that is in the set of the variables x.

In some embodiments of the third aspect and the fourth aspect, the method further includes defining the predetermined cost function based on data associated with the predetermined optimization problem.

In some embodiments of the third aspect and the fourth aspect, the method further includes obtaining one or more variables of the set of the variables x from at least one or more sensors and/or one or more computing devices.

In some embodiments of the third aspect and the fourth aspect, the method further includes commanding actuation of one or more actuators based on one or more variables of the updated set of the variables $x_U$ after the repeating step.

In some embodiments of the first aspect, the second aspect, the third aspect and the fourth aspect, the predetermined optimization problem is one of the following:

cost function optimization in machine learning algorithms (both supervised and unsupervised), such as in neural networks; or solution of combinatorial optimization problems, with and without constraints; or optimization in a factory line, e.g., of resources thereof, of energy consumption thereof, etc.; or predictive maintenance in manufacturing; or optimization of air/sea/road traffic of means of transportation, e.g., air, sea, road, etc.; or optimization of electric markets; or portfolio optimization in finance; or optimization of cost functions in computer vision systems, factories and other environments.

In some embodiments of the first aspect, the second aspect, the third aspect and the fourth aspect, a target associated with the predetermined optimization problem includes one of the following: a computing device or system, a factory line or a machine thereof, a factory, means of transportation, an electric grid or network, or a wind farm.

In some embodiments of the first aspect, the second aspect, the third aspect and the fourth aspect, the at least one quantum processor includes or is part of a variational quantum circuit on one or more universal gate-based quantum computers, such as those based on superconducting qubits, cold atoms, ion traps, photonic systems, quantum dots, etc.

Similar advantages as those described in relation to the first and second aspects also apply to the third and fourth aspects.

A fifth aspect relates to a computer program including instructions which, when the program is executed by at least one computing device with at least one classical processor, cause the at least one computing device to carry out the steps of a method as disclosed in the third aspect or the fourth aspect.

In some embodiments, the computer program is embodied on a non-transitory computer-readable storage medium storing the computer program.

A sixth aspect relates to a data carrier signal carrying a computer program as described in the fifth aspect.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION

Figures 1, 2, 3, 4:
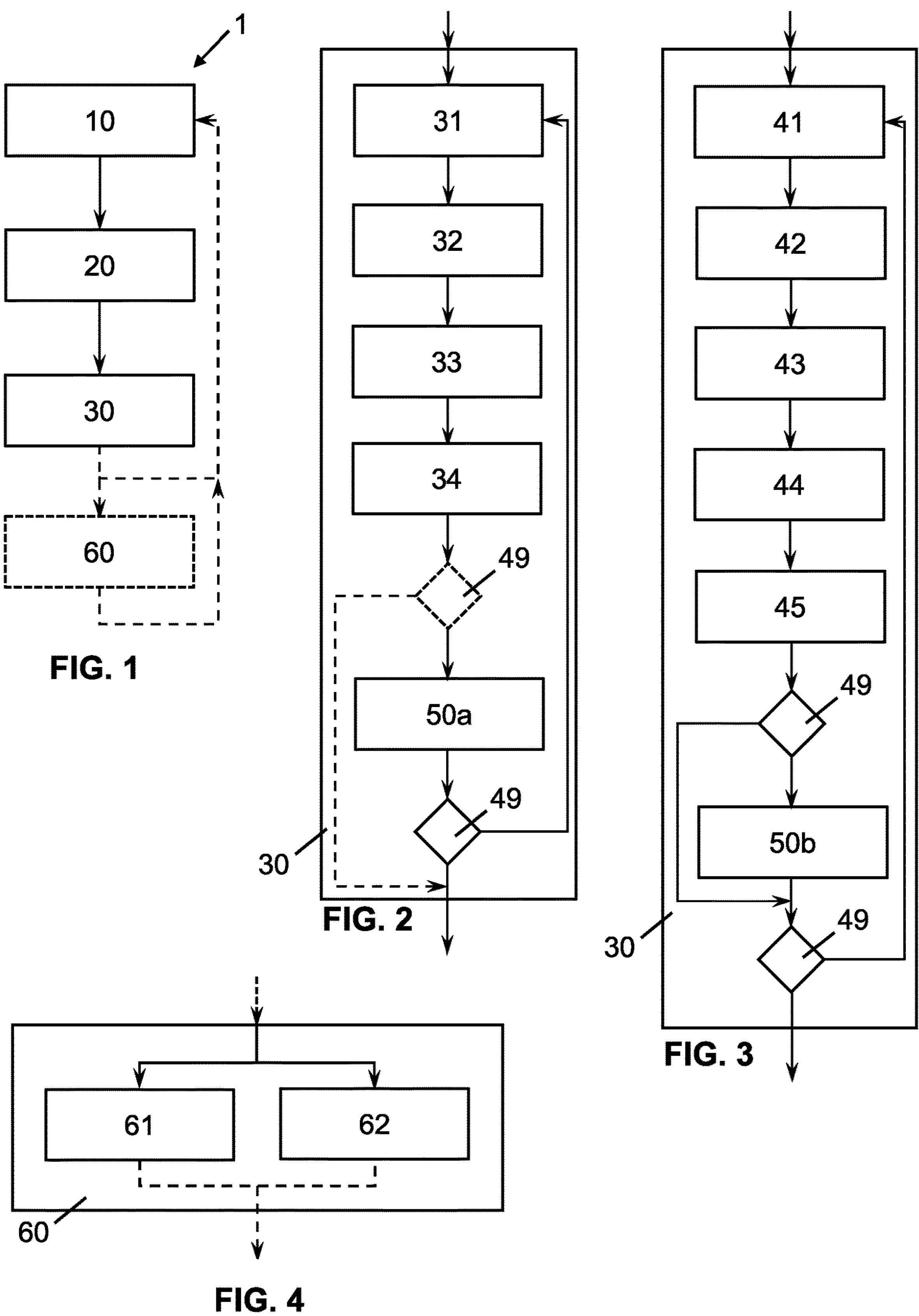
FIG. 1 shows a method in accordance with embodiments.
FIGS. 2, 3 and 4 show variants of steps of methods in accordance with embodiments.

FIG. 1 shows a method 1 in accordance with embodiments.

The method 1 has a first step 10 involving the calculation of the cost of a given cost function associated with a given optimization problem, in turn associated with a given target to be configured and/or controlled. The cost function takes a set of variables, e.g., $x=\{x_1, x_2, \ldots, x_n\}$, as parameters. In this sense, a first set of variables is used for the calculation of the cost. Such set may be composed of values provided by, e.g., one or more sensors, one or more computing devices, etc., related to the operation and/or configuration of the target, or of any device, system or process influencing the behavior of the target, e.g., available power, temperature, pressure, throughput of a server providing data, etc.; in some embodiments, the first step 10 includes obtaining at least some of the variables or values thereof.

The calculation of the cost is conducted by an apparatus or system comprising at least one classical processor and/or at least one quantum processor, hence the calculation can be part of a computer program.

The first step 10 also includes, in some embodiments, obtaining the cost function from, e.g., a computing device or a user input device, or defining the cost function using data related to the optimization problem and, thus, related to the target.

The method 1 has a step 20 whereby the calculated cost is to form part of the set of variables that the cost function takes as parameters. For that, the classical processor(s) and/or the quantum processor(s) add/s the cost to the set of variables as an additional variable.

The method 1 has an optimization step 30 in which the classical processor(s) and/or the quantum processor(s) iterate/s a plurality of times an optimization technique, thereby solving the optimization problem with multiple optimization repetitions. The optimization step 30 will be described in more detail with reference to FIGS. 2 and 3.

The method 1 also includes, in some embodiments as illustrated with a dashed border, an output step 60 whereby the classical processor(s) and/or the quantum processor(s) output the solution to the optimization problem as will be described further with reference to FIG. 4.

The method 1 also includes, in some embodiments, the option of continued control or reconfiguration of a target by solving optimization problems related to the target multiple times. To that end, after the optimization 30 and/or after the output step 60, the method can be run again from the first step 10 as illustrated with dashed arrow lines.

FIG. 2 shows a variant of the optimization step 30 of methods in accordance with embodiments.

The optimization step 30 includes a step 31 of defining a target coordinate system such as, e.g., a hyperspherical coordinate system. In the first repetition of the definition step 31, the definition of the target coordinate system is with the set of the variables resulting from step 20 described in FIG. 1, i.e., with the calculated cost included. In subsequent repetitions, the set of the variables used is an optimized one as it will be explained below in relation to step 50*a*.

As a result, a functional (e.g., $F[f]=F(x_1,x_2, \ldots, x_n,x_{n+1})$, where $x_1$ to $x_n$ are the variables of the original set of variables, and $x_{n+1}$ is the cost variable), is obtained in said target coordinate system. It is noted that the cost function and the optimization problem referred to in the first step 10 of FIG. 1 are in a coordinate system different from the target one; for example, the coordinate system of the cost function and the optimization problem is a Cartesian coordinate system.

Then, a gradient descent application step 32 takes place, which involves applying such optimization technique to the obtained functional in the target coordinate system to obtain an optimized version.

The optimized version is converted in step 33 into a different coordinate system, particularly the original coordinate system of the cost function and the optimization problem. The set of variables, already optimized in the target coordinate system and with the cost included as a variable, is obtained in said different coordinate system as well.

The cost function is again evaluated in step 34 to calculate its cost thereof, this time with the optimized set of variables as parameters.

Evaluation 49 may take place after calculating the cost in step 34. Particularly, a convergence in the optimization of the cost is evaluated 49 to determine whether there is being too little convergence or not in the optimization, which is indicative of whether there is still room for improvement in the optimization or not. For that, the most recently calculated cost (that of step 34) and a previous calculated cost (that of a previous repetition and obtained at step 34, or the initially calculated cost of the first step 10) are evaluated and compared with a predetermined threshold.

The convergence does not need to be evaluated 49 with an immediately previous calculated cost (i.e., that of a previous repetition), nor that only one evaluation is necessary to decide whether the optimization has ended and so no further repetitions are to be carried out; any strategy to that end falls within the scope of the present disclosure. In any case, the evaluation 51 does not take place at least until the second repetition of the optimization step 30, i.e., at least after the step 31 has not taken place twice.

In those embodiments in which the evaluation 49 takes place between steps 34 and 50*a*, when it is determined that the optimization has ended, the optimization step 30 ends (following the dashed arrow line), otherwise the optimization step 30 proceeds to step 50*a*. In the embodiments in which the evaluation 49 does not take place between steps 34 and 50*a*, after calculating the cost in step 34, the optimization step 30 proceeds to step 50*a*.

In step 50*a*, the set of the variables that is used in the definition of the target coordinate system in step 31 takes the variables of the optimized set, i.e., that resulting from the optimization of step 32 and obtained in the different coordinate system in step 33, and the cost variable (e.g., $x_{i+1}$) is updated by the most recent calculated cost (of step 34). This means that, upon repeating the optimization step 30 starting from step 31, the target coordinate system will be defined with the updated set of variables.

After step 50*a*, the aforesaid evaluation 49 takes place, and if it has been determined that the optimization has ended due to the attained convergence, the optimization step 30 ends, otherwise it goes back to step 31.

FIG. 3 shows a variant of the optimization step 30 of methods in accordance with embodiments.

The optimization step 30 includes a step 41 of defining a rotation matrix in such a way that a turning angle is provided between each variable, particularly an axis thereof in a first predetermined reference frame, in the set of variables resulting from step 20, i.e., with the calculated cost (in some embodiments, the calculated cost variable is not considered for the provision of a turning angle for it), and the most recent calculated cost (in the first repetition, it is that resulting from the first step 10), particularly an axis thereof in the first predetermined reference frame. That is to say, turning angles are provided between the respective axis of each of $x_1$ to $x_n$ and the axis of $x_{n+1}$, where $x_{n+1}$ is the most recent calculated cost of the cost function. After the first repetition, the set of the variables used is an optimized one as it will be explained below in relation to step 50*b*.

For the definition of the rotation axis, the step 41 may include a step of defining an axis for each variable in the set of variables, including the calculated cost variable, in a first predetermined reference frame. The axes are defined such that there is orthogonality between all axes.

The obtained rotation matrix is applied to the set of variables (including the cost variable) in step 42 to move the variables to a second predetermined reference frame.

Then, in step 43, gradient descent is applied to the cost function taking the rotated set of variables of step 42. That is to say, the set of variables inputted in the cost function is in the second predetermined reference frame.

The optimized set of variables obtained in step 43 is moved back, in step 44, to the first predetermined reference frame by applying the inverse of the rotation matrix defined in step 41 to said optimized set.

With the optimized set of variables in the first predetermined reference frame, the cost function is evaluated again in step 45, thereby obtaining the most recent cost.

Like in the variant of FIG. 2, in some embodiments there may be evaluation 49 occurring after step 45 and before step 50*b* to determine whether the optimization shall continue or not. In absence of such evaluation 49, step 50*b* takes place after calculating the cost in step 45.

In step 50*b*, the set of the variables that is considered for the turning angles in the definition of the rotation matrix in step 41 and then moved to the second predetermined reference frame takes the variables of the optimized set, i.e., that resulting from the optimization of step 43 and moved to the first predetermined reference frame in step 44, and the cost variable is updated by the most recent calculated cost (of step 45).

After step 50*b*, the evaluation 49 takes place, and if it has been determined that the optimization has ended due to the attained convergence, the optimization step 30 ends, otherwise it goes back to step 41.

FIG. 4 shows an output step 60 of methods in accordance with embodiments.

As aforesaid, methods in accordance with some embodiments include an output step 60.

The output step 60 may include a step 61 of providing a solution to the optimization problem in the form of user perceptible signals (in, e.g., a screen, loudspeakers, etc.) to enable manual input of one, some or all optimized values of the variables into the target related to the optimization problem, or to at least one controller of the target.

Additionally or alternatively, the output step 60 may include a step 62 of providing a solution to the optimization problem to the target or to at least one controller of the target. To that end, the classical processor(s) and/or the quantum processor(s) provide the optimized values of the variables encoded in one or more digital instructions that enable configuration/reconfiguration of the target.

Figure 5:
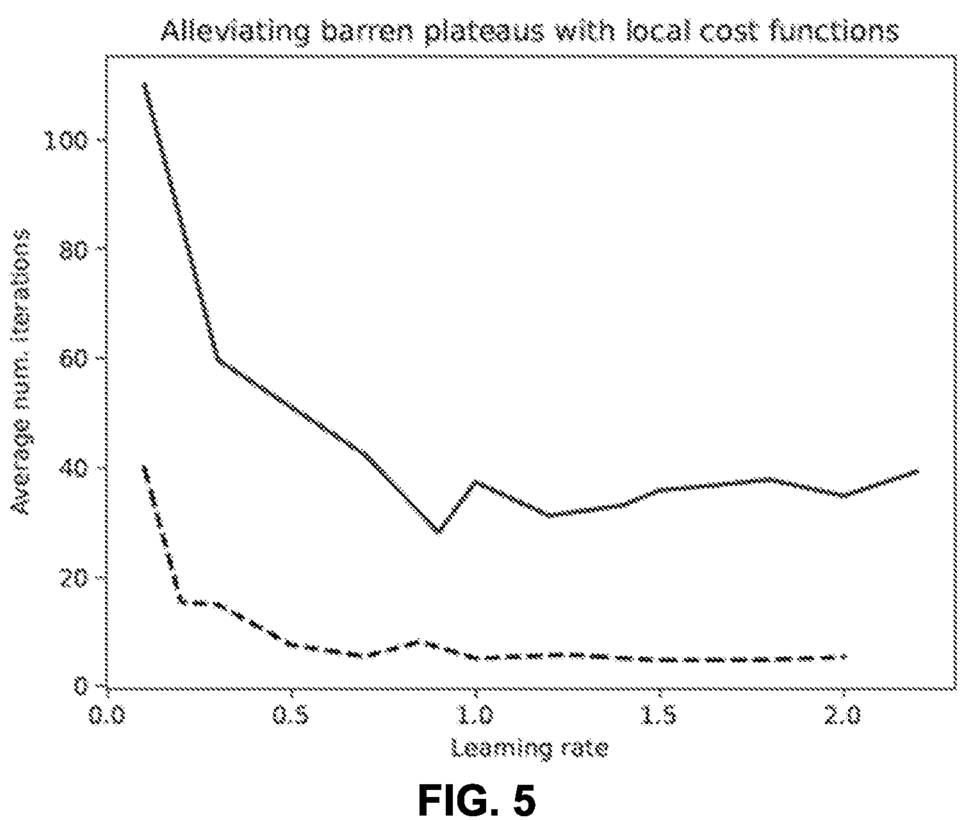
FIG. 5 shows a comparison of the average number of iterations needed by a prior art optimizer and the optimizers of the present disclosure in alleviation of barren plateaus.

FIG. 5 shows a comparison of the average number of iterations needed by the PennyLane optimizer (shown with solid line) and the optimizers of the present disclosure (shown with dashed line) in alleviation of barren plateaus.

The graph shows the average number of iterations versus the learning rate of the optimizer. The reduction in number of iterations is approximately between 40% to 70% depending on the learning rate. That, in turn, can lead to reduction in both energy consumption and time consumption. In this regard, it is noted that training an Artificial Intelligence model such as ChatGPT4 is around 100 million US dollars in electricity bill, hence reduction in energy consumption is significantly beneficial.

By shortening the optimization times, the apparatus or system applying the optimization technique can react considerably quicker to potential problems or sub-optimal configurations of targets, thereby reducing the loss of, e.g., raw materials, energy, etc., and reducing the risk of hazards.

Although not illustrated in graphic form, the optimizers of the present disclosure have also a better performance than, e.g., PennyLane, in other optimization problems as summarized in the table below, which compares convergence speeds in terms of average number of iterations.

-continued

| Optimization problem | Convergence speed or number of iterations: Prior art | This disclosure |
|---|---|---|
| Function Fitting using Quantum Signal Processing - Polynomial/Non-Polynomial | 90/112 | 54/94 |
| Variational Quantum Thermalizer | 103 | 52 |
| Function Fitting with Photonic Quantum Neural Network | 70 | 51 |
| Perturbative Gadgets for Variational Quantum Algorithms | 140 | 110 |
| Variational Classifier Iris classification | 96 | 80 |
| Quantum natural gradient (Paper) (QNG/Adam) and (GD/Adam) | 26/88 | 19/75 |
| Accelerating VQEs with Quantum Natural Gradient: Hydrogen VQE (QNG/GD) | 20 | 16 |
| Accelerating VQEs with Quantum Natural Gradient: Single-qubit VQE/Hydrogen VQE (Adam) | 182/103 | 158/62 |
| VQE in Different Spin Sectors S = 0/S = 1 | 166/54 | 142/34 |
| Alleviating Barren Plateaus | 29.14 | 4.7 |

Figure 6:
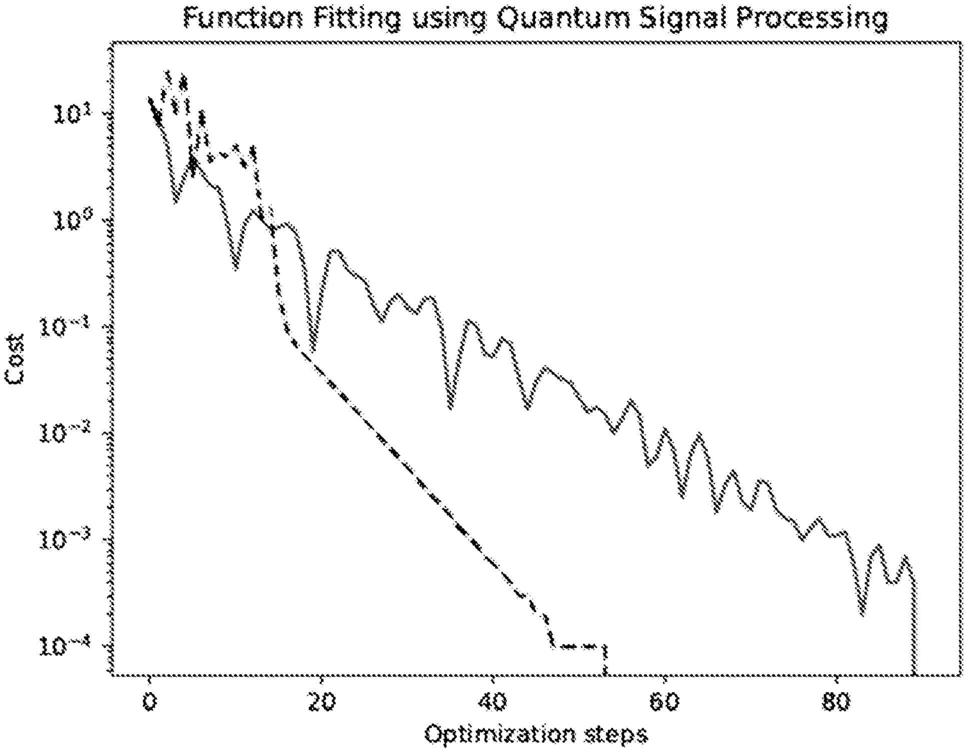
FIGS. 6, 7 and 8 show comparisons of the average cost of a prior art optimizer and the optimizers of the present disclosure, in terms of the number of optimization steps, for several optimization problems.
Figure 7:
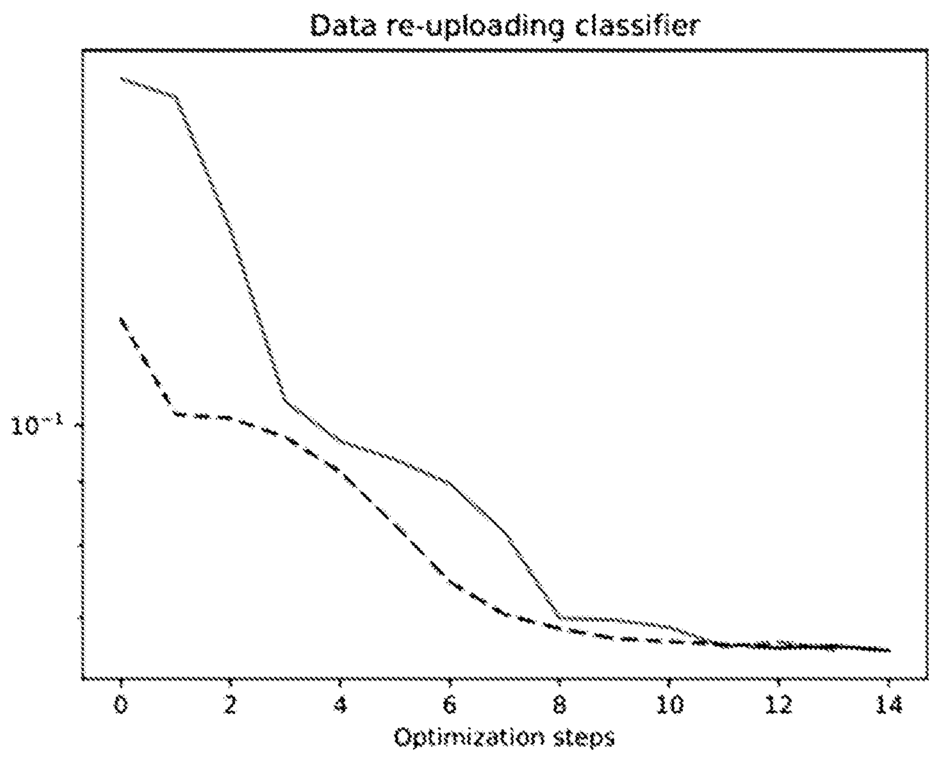
Figure 8:
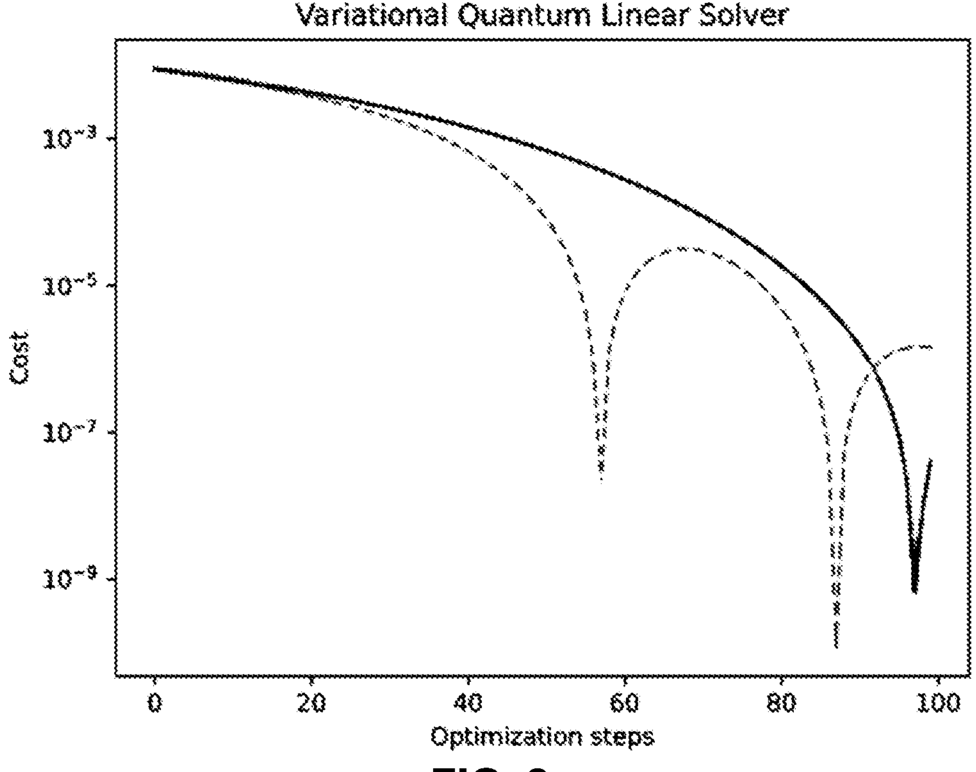

FIGS. 6, 7 and 8 show comparisons of the average cost of the PennyLane optimizer (shown with solid line) and the optimizers of the present disclosure (shown with dashed line), in terms of the number of optimization steps, for several optimization problems. Each of the graphs show the cost versus the number of optimization steps.

The graph of FIG. 6 relates to a function fitting problem using a quantum signal processing. The graph of FIG. 7 relates a data re-uploading classifier. And the graph of FIG. 8 relates to a variation quantum linear solver.

As it can be seen, in all cases the optimizers of the present disclosure outperform, in greater or lesser degree, PennyLane, with lower cost for almost all number of optimization steps considered.

For further information, additional comparisons for different optimization problems are shown in the table below in terms of minimum loss.

| Optimization problem | Minimum loss (cost): Prior art | This disclosure |
|---|---|---|
| Quantum models as Fourier series | $9.67 \times 10^{-13}$ | $1.55 \times 10^{-13}$ |
| Variational Classifier Iris classification | $23.229 \times 10^{-2}$ | $23.0293 \times 10^{-2}$ |
| Variational Quantum Linear Solver | $5.83 \times 10^{-10}$ | $1.16 \times 10^{-10}$ |
| Variational Quantum Continuous Optimization, for approximating a mathematical function, with 8 qubits, 80 layers | $1.384 \times 10^{-4}$ | $6.9417 \times 10^{-5}$ |

In this text, the term "includes", "comprises" and derivations thereof (such as "including", "comprising", etc.) should not be understood in an excluding sense, that is, these terms should not be interpreted as excluding the possibility that what is described and defined may include further elements, steps, etc.

Although the terms $f(x)$, x, F[$f$], and the like have been used in the present disclosure to refer to costs functions, sets of variables, and functionals, it will be noted that any other nomenclature could be used without departing of the scope of the present disclosure.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

What is claimed is:

1. An apparatus or system configured to:

calculate a cost of a predetermined cost function, $f(x)$, associated with both a predetermined optimization problem and a set of variables as parameters, wherein the cost is calculated taking a predetermined set of the variables, x, associated with the predetermined optimization problem as parameters;

include the calculated cost in the set of the variables x; and repeat the following N times:

define a first predetermined coordinate system with a set formed by the set of the variables x including the most recent calculated cost of the cost function $f(x)$, thereby obtaining a functional $F[f]$;

apply gradient descent to the functional $F[f]$, thereby obtaining an optimized functional $F_O[f]$;

convert the optimized functional $F_O[f]$ into a second predetermined coordinate system different from the first predetermined coordinate system, and provide the set of the variables x with values from the converted optimized functional $F_O[f]$, thereby obtaining an updated set of the variables $x_U$; and calculate the cost of the cost function $f(x)$ taking the updated set of the variables $x_U$ as parameters;

wherein the repetition takes place at least until a difference between the most recent cost of the cost function $f(x)$ and at least one previous cost of the cost function $f(x)$ is equal to or less than a predetermined convergence threshold;

wherein the apparatus or system is further configured to replace the set of the variables x by the updated set of the variables $x_U$ in at least all repetitions from the first to the N-th minus one, and in each said replacement or after each said replacement, replace the cost of the cost function $f(x)$ by the most recent calculated cost of the cost function $f(x)$ so that the set of the variables x includes the most recent calculated cost of the cost function $f(x)$; and wherein N is a natural number greater than one.

2. The apparatus or system of claim 1, wherein the apparatus or system is further configured to either obtain the predetermined cost function from a computing device or a user input device or define the predetermined cost function based on data associated with the predetermined optimization problem.

3. The apparatus or system of claim 1, wherein the apparatus or system is further configured to obtain one or more variables of the set of the variables x from at least one or more sensors or one or more computing devices or both the one or more sensors and the one or more computing devices.

4. The apparatus or system of claim 1, wherein the apparatus or system is further configured to command actuation of one or more actuators based on one or more variables of the updated set of the variables $x_U$ after doing all the repetitions.

5. The apparatus or system of claim 1, wherein the first predetermined coordinate system is a hyperspherical coordinate system.

6. The apparatus or system of claim 1, wherein the second predetermined coordinate system is a Cartesian coordinate system.

7. The apparatus or system of claim 1, wherein the predetermined optimization problem is one of the following: cost function optimization in a machine learning algorithm; or solution of a combinatorial optimization problem; or optimization in a factory line; or predictive maintenance in manufacturing; or optimization of traffic of air or sea or road means of transportation; or optimization of an electric market; or finance portfolio optimization; or optimization of one or more cost functions in a computer vision system or a factory.

8. The apparatus or system of claim 1, wherein a target associated with the predetermined optimization problem includes one of the following: a computing device or system, a factory line or a machine thereof, a factory, means of transportation, an electric grid or network, or a wind farm.

9. An apparatus or system configured to:

calculate a cost of a predetermined cost function, $f(x)$, associated with both a predetermined optimization problem and a set of variables as parameters, wherein the cost is calculated taking a predetermined set of the variables, x, associated with the predetermined optimization problem as parameters;

include the calculated cost in the set of the variables x;

repeat the following N times:

define a first rotation matrix such that there is a turning angle between each variable in the set of the variables x and the most recent calculated cost of the cost function $f(x)$ in a first predetermined reference frame;

apply the first rotation matrix to the set of the variables x so that it is moved to a second predetermined reference frame;

apply gradient descent to the cost function $f(x)$ with the set of the variables x in the second predetermined reference frame, thereby obtaining an optimized set of the variables x in the second predetermined reference frame;

apply a second rotation matrix to the optimized set of the variables x in the second predetermined reference frame thereby obtaining an optimized set of the variables x in the first predetermined reference frame, the second rotation matrix being an inverse of the first rotation matrix; and calculate the cost of the cost function $f(x)$ in the first predetermined reference frame with the optimized set of the variables x in the first predetermined reference frame;

wherein the repetition takes place at least until a difference between the most recent cost of the cost function $f(x)$ and at least one previous cost of the cost function $f(x)$ is equal to or less than a predetermined convergence threshold; and wherein the apparatus or system is further configured to replace the set of the variables x by the optimized set of the variables x in the first predetermined reference frame in at least all repetitions from the first to the N-th minus one, and in each said replacement or after each said replacement, replace the cost of the cost function $f(x)$ by the most recent calculated cost of the cost function $f(x)$ so that the set of the variables x includes the most recent calculated cost of the cost function $f(x)$; and wherein N is a natural number greater than one.

10. The apparatus or system of claim 9, wherein the apparatus or system is further configured to: include, in the set of the variables x, the axis for each variable; and optimize, in one or more repetitions of all the repetitions, the axis of each variable that is in the set of the variables x;

wherein the definition of the axis for each variable is based on the axis of each variable that is in the set of the variables x.

11. The apparatus or system of claim 9, wherein the apparatus or system is further configured to either obtain the predetermined cost function from a computing device or a user input device or define the predetermined cost function based on data associated with the predetermined optimization problem.

12. The apparatus or system of claim 9, wherein the apparatus or system is further configured to obtain one or more variables of the set of the variables x from at least one or more sensors or one or more computing devices or both the one or more sensors and the one or more computing devices.

13. The apparatus or system of claim 9, wherein the apparatus or system is further configured to command actuation of one or more actuators based on one or more variables of the updated set of the variables $x_U$ after doing all the repetitions.

14. The apparatus or system of claim 9, wherein the first predetermined coordinate system is a hyperspherical coordinate system.

15. The apparatus or system of claim 9, wherein the second predetermined coordinate system is a Cartesian coordinate system.

16. The apparatus or system of claim 9, wherein the predetermined optimization problem is one of the following: cost function optimization in a machine learning algorithm; or solution of a combinatorial optimization problem; or optimization in a factory line; or predictive maintenance in manufacturing; or optimization of traffic of air or sea or road means of transportation; or optimization of an electric market; or finance portfolio optimization; or optimization of one or more cost functions in a computer vision system or a factory.

17. The apparatus or system of claim 9, wherein a target associated with the predetermined optimization problem includes one of the following: a computing device or system, a factory line or a machine thereof, a factory, means of transportation, an electric grid or network, or a wind farm.

18. A method for solving a predetermined optimization problem, the method being run in an apparatus or system in turn comprising at least one classical processor or at least one quantum processor or both the at least one classical processor and the at least one quantum processor, the method comprising:

calculating a cost of a predetermined cost function, $f(x)$, associated with both a predetermined optimization problem and a set of variables as parameters, wherein the cost is calculated taking a predetermined set of the variables, x, associated with the predetermined optimization problem as parameters;

including the calculated cost in the set of the variables x;

repeating the following N times:

defining a first predetermined coordinate system with a set formed by the predetermined cost function and the set of the variables x including the most recent calculated cost of the cost function $f(x)$, thereby obtaining a functional $F[f]$;

applying gradient descent to the functional $F[f]$, thereby obtaining an optimized functional $F_O[f]$;

converting the optimized functional $F_0[f]$ into a second predetermined coordinate system different from the first predetermined coordinate system, and providing the set of the variables x with values from the converted optimized functional $F_O[f]$, thereby obtaining an updated set of the variables $x_U$; and calculating the cost of the cost function $f(x)$ taking the updated set of the variables $x_U$ as parameters; and replacing, at least in each repetition from the first to the N-th minus one, the set of the variables x by the updated set of the variables $x_U$, and in each said replacement step or after each said replacement step, replacing the cost of the cost function $f(x)$ by the most recent calculated cost of the cost function $f(x)$ so that the set of the variables x includes the most recent calculated cost of the cost function $f(x)$; wherein the repeating step is repeated at least until a difference between the most recent cost of the cost function $f(x)$ and at least one previous cost of the cost function $f(x)$ is equal to or less than a predetermined convergence threshold; and wherein N is a natural number greater than one.

19. The method of claim 18, further comprising either obtaining the predetermined cost function from a computing device or a user input device or defining the predetermined cost function based on data associated with the predetermined optimization problem.

20. The method of claim 18, further comprising obtaining one or more variables of the set of the variables x from at least one or more sensors or one or more computing devices or both the one or more sensors and the one or more computing devices.

* * * * *